March 26, 1974 H. BOHM ET AL 3,799,809

FUEL CELL

Filed Feb. 23, 1972 3 Sheets-Sheet 1

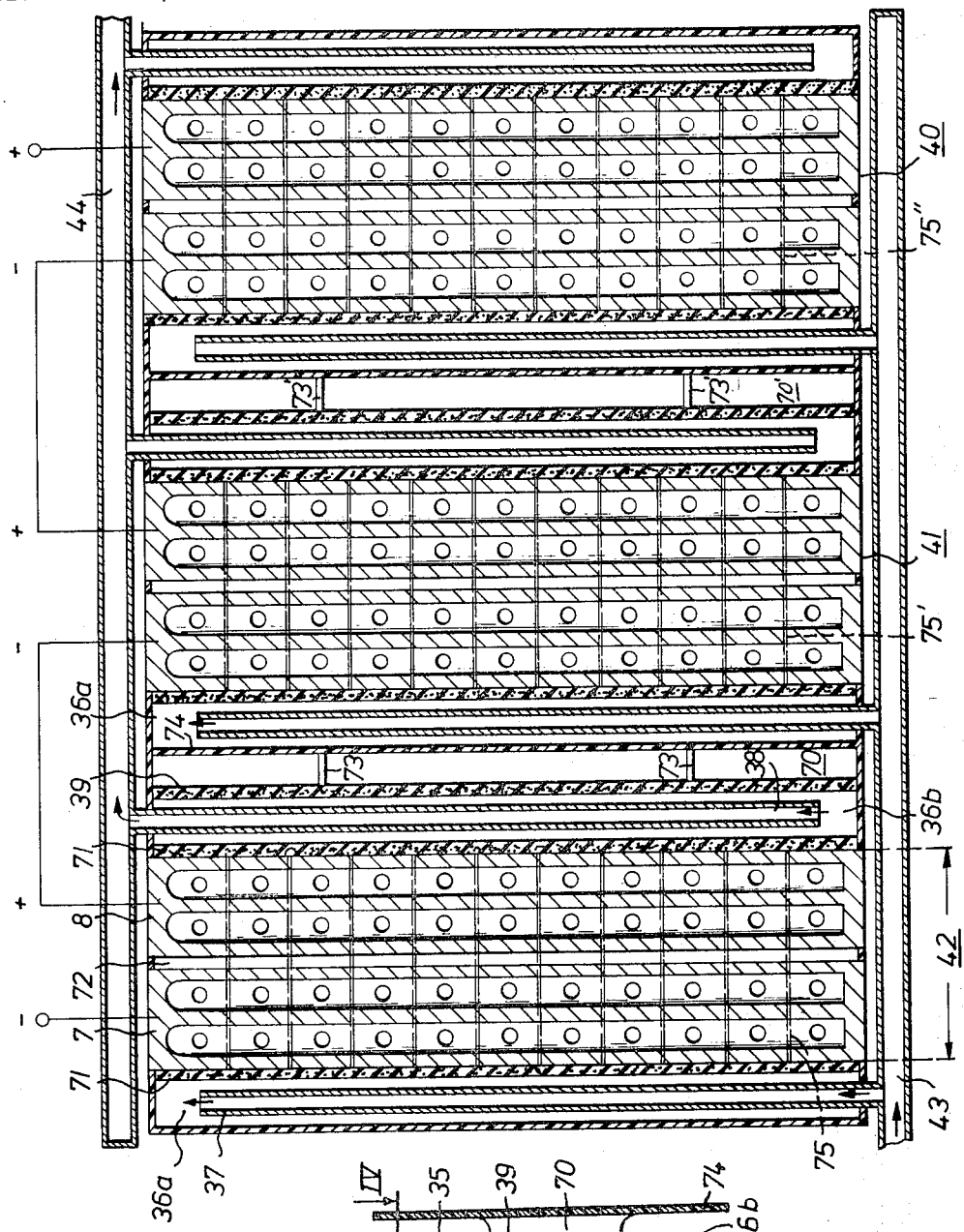

United States Patent Office 3,799,809
Patented Mar. 26, 1974

3,799,809
FUEL CELL
Harald Bohm, Oberursel, and Gerhard Louis, Frankfurt-Schwanheim, Germany, assignors to Licentia Patent-Verwaltungs-G.m.b.H., Frankfurt am Main, Germany
Filed Feb. 23, 1972, Ser. No. 228,616
Claims priority, application Germany, Feb. 23, 1971,
P 21 08 537.0
Int. Cl. H01m 27/02
U.S. Cl. 136—86 R                              6 Claims

ABSTRACT OF THE DISCLOSURE

A fuel cell having an anode and a cathode each in the form of a particulate filling, the anode and cathode being separately contained. The anode and cathode are soaked by an electrolyte continuous between the anode and cathode, while fuel is interspersed in the anode and an oxidant is interspersed in the cathode.

BACKGROUND OF THE INVENTION

The present invention relates to a power fuel cell having electrodes of catalytically active, powdered material.

The book, Elektrochemische Stromerzeugung (in translation, Electrochemical Current Production), by F. V. Sturm, Siemens-Verlag (Publishers), 1969, describes at pages 108 and 109 a fuel cell using electrodes containing powdered material. The cell includes a disc-shaped, porous, supporting framework, through which electrolyte flows. Asbestos paper lies against both sides of the framework. Layers of catalyst powder are pressed against the asbestos paper by metal screens, which serve for current leads. The reaction gases press through the screens.

The fuel cell described by Sturm applies the principles appearing in the likewise disc-shaped gas diffusion electrodes. Only a narrow, three-phase (catalyst, electrolyte, and fuel) reaction zone arises, and, consequently, there is a poor utilization of the catalyst material. Thus, in spite of electrodes of large surface area, the achievable current strengths are small.

The cell described by Sturm has, furthermore, a multiplicity of special structural elements (supporting frame, metal screens, structure for forming gas chambers from which the reaction gases press through the metal screens). It requires auxiliary means (asbestos membranes) for preventing the reaction gases from getting into the supporting frame, since the supporting frame cannot be made gas tight. Making the cell described by Sturm is relatively complicated and, when a number of individual cells are to be assembled into a fuel battery, a cumbersome technology results (questions of corrosion, sealing, etc.). There is furthermore a problem of high manufacturing costs and an unfavorable ratio of power to weight.

SUMMARY OF THE INVENTION

An object of the present invention, therefore, is to provide a power fuel cell having electrodes providing a significantly higher power-to-weight ratio than provided by the above-described powder electrodes or by gas diffusion electrodes.

Another object is to provide a fuel cell made of a small number of simple constructional elements, so that the cell is easy to make.

These as well as other objects which will become apparent in the discussion that follows are achieved, according to the present invention, by a fuel cell including an anode in the form of a particulate filling, means for containing the anode, a cathode in the form of a particulate filling, means for containing the cathode, means for enabling soaking of the anode and the cathode by an electrolyte continuous between the anode and the cathode, means for enabling the interspersing of fuel in the anode, and means for enabling the interspersing of oxidant in the cathode.

BRIEF DESCRIPTION OF THE DRAWINGS

FIG. 3 is a schematic elevational section of another embodiment of a fuel cell according to the present invention.

FIG. 4 is a schematic sectional plan view of a plurality of cells according to FIG. 3 electrically connected together with the left part corresponding to FIG. 3 as viewed from the section line IV—IV.

DESCRIPTION OF THE PREFERRED EMBODIMENTS

In the following preferred embodiments, each electrode is emplaced as a filling of loose (i.e. no bonding between the powder particles) powder in a container, with the filling being intermingled with both the electrolyte and the particular reactant associated with the particular electrode.

Figure 1:
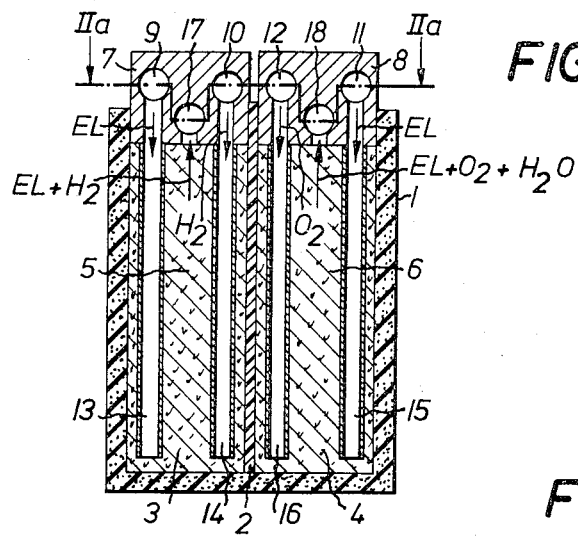
FIG. 1 is a schematic elevational section through one embodiment of a fuel cell according to the present invention.

Referring to FIG. 1, the fuel cell shown there includes a box-like container 1 having, for example, rectangular faces. The interior of the container 1 is divided into an anode chamber 3 and a cathode chamber 4 by a dividing wall in the form of a vertically extending, porous membrane 2. The container 1 can be made of electrically insulating material, for example ceramic, and the membrane 2 can be made, for example, of polyvinyl chloride. The membrane has a high porosity; however, its pore radii are small (about 0.5 micron) to make it gas impervious, so that a bubbling of gas through the membrane to an opposite electrode is prevented.

Catalyst powder 5 and 6 is filled into the anode and cathode chambers 3 and 4 of the container 1. The catalyst powder is maintained under a pressure of about 1 to 10 kiloponds/cm.² by lids 7 and 8 of graphite closing the chambers 3 and 4. This pressure assures good electrical contact between the particles of the electrodes. Lids 7 and 8 serve further as electrical leads to and from the catalyst powder. Catalyst powder 5 may be, for example, tungsten carbide produced as in U.S. patent application Ser. No. 880,898, filed Nov. 28, 1969, by Harald Böhm et al. now Pat. No. 3,676,489, for an "Electrode Material," while catalyst powder 6 may be, for example, a mixture of 50% by weight activated carbon and 50% by weight porous hard coal, as supplied by Ringsdorffwerke, D-532 Bad Godesberg-Mehlem, Germany, under the name "EK 15." "EK 15" has a resistivity of $6 \times 10^{-3}$ ohm·cm.

Lids 7 and 8 have two bores 9 and 10, and 11 and 12, respectively, and these are in communication with graphite tubes 13, 14, and 15, 16, respectively, which penetrate into the powder fillings 5 and 6 for the continuous flowing of electrolyte and gas reactants into the catalyst powder. For example, hydrogen gas is caused to flow through tube 14 and oxygen gas is caused to flow through tube 16, while electrolyte EL is caused to flow through the tubes 13 and 15 to soak the catalyst powders 5 and 6, respectively. Tubes 13 and 16 reach approximately to the bottom of container 1. The gas pressure is about 3 atmospheres gage pressure. The electrolyte may be, for example, 2-normal $H_2SO_4$.

A third set of bores at the tops of the electrodes, bores 17 and 18, in lids 7 and 8, respectively, provide for the continuous removal of the resulting fuel and oxidant gas and electrolyte mixtures together with the water of reaction arising from the chemical combining of the respectively oxidized and reduced hydrogen and oxygen gases.

This cell construction yields an intensive mixing of gas and electrolyte within the catalyst fillings 5 and 6. This mixing has the effect of very efficiently utilizing the entire catalyst material, rather than just a narrow reaction zone as is the case in the powdered electrodes mentioned above in the Background of the Invention and as is also the case in gas diffusion electrodes. There is no formation of a three-phase reaction *zone*, as in the prior electrodes, but rather a three-phase *mixture*, which fills the entire electrode chambers.

Figure 2A:
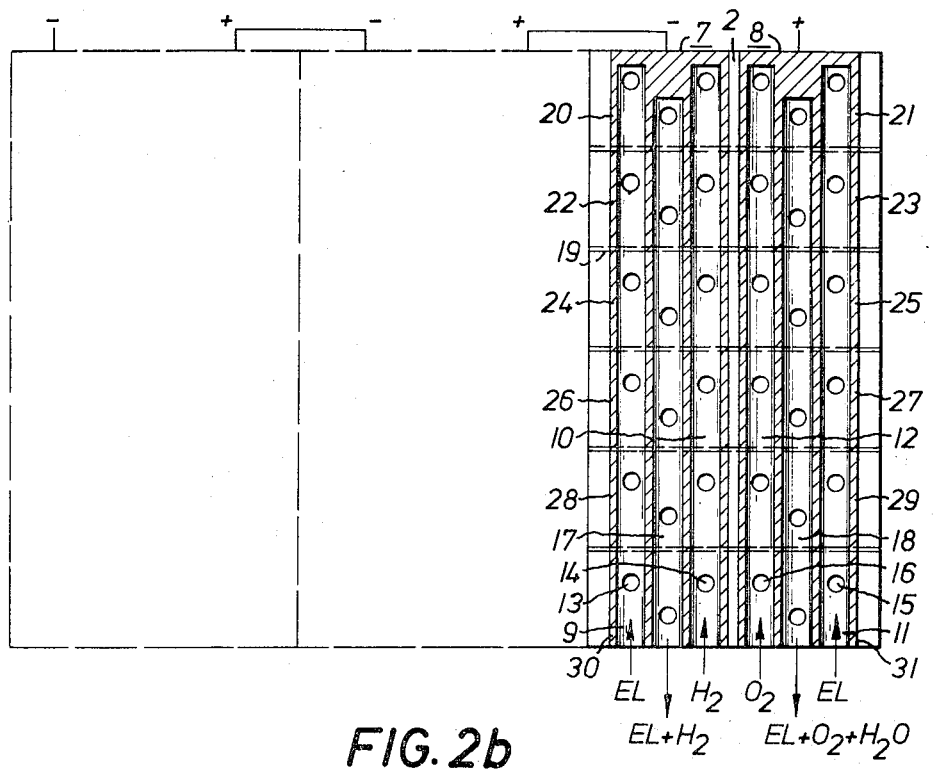
FIG. 2a includes on its right side a schematic view of a modification of the cell of FIG. 1 from the section line IIa—IIa with the middle and left sides illustrating other cells like that of FIG. 1.

The cell of FIG. 1 is viewed from above in FIG. 2a, and has been modified in that its depth has been divided into six separate cells connected in parallel. Membrane 2 extends continuously over the entire depth of container 1.

The purpose of dividing the depth into six separate cells is to limit the sizes of the electrode chambers to obtain thorough mixing of electrolyte and gases and better utilization of all the catalyst material in the container. The division into the six separate cells is obtained using walls 19 situated perpendicularly to membrane 2. Walls 19 create chambers 20 to 31, the odd-numbered chambers corresponding to the cathode chambers 4 of FIG. 1 and the even-numbered chambers corresponding to the anode chambers 3 of FIG. 1. Catalyst powder has been filled into chambers 20 to 31, so that here also there is obtained an intensive mixing of electrolyte and gases with the catalyst powder. The lids 7 and 8 are formed from single, continuous pieces of elongated graphite blocks which fit down into container 1, as shown schematically in FIG. 2b.

Figure 2B:
FIG. 2b is an elevational schematic view of the structure of FIG. 2a, corresponding to the view in FIG. 1.

As indicated by the dashed blocks in the middle and left of FIGS. 2a and 2b, several units like that in the right of the FIGS. 2a and 2b can be grouped together to form a battery, with the units being connected electrically in series. The units are connected by electrolyte bores 9 and 11 to an electrolyte main supply line (not shown). The electrolyte-gas mixtures, plus additional water of reaction, are extracted through bores 17 and 18. The gas is later separated (not shown) from the electrolyte and may then be recycycled through gas inlet bores 10 and 12, with the electrolyte being fed back into bores 9 and 11.

Referring now to FIG. 3, the electrolyte is fed continuously through the wall of container 71 into the catalyst powder to soak it. The cell here, as in FIG. 1, includes a box-shaped container, container 71, and a dividing wall in the form of a membrane 72. Here container 71 is porous, as well as the membrane 72. Sintered ceramic can be used for forming container 71 and membrane 72 as one integral piece. Both container and membrane have a high porosity, but small pore radii (about 0.5 micron) to make them gas impervious, in order that gas bubbles cannot get through the container wall or through the membrane to the opposite electrode. The anode and cathode chambers 3 and 4 formed by container 71 and membrane 72 contain the catalyst powders 5 and 6 and are closed, as in FIG. 1, by graphite blocks 7 and 8, respectively. These blocks contain bores 30 and 31, and 32 and 33, for gas feeding and removal, gas flow directions being indicated by the arrows. Bores 30 and 32 terminate in feed tubes 34 and 35 extending approximately to the bottom of the container. Thus, the gases are introduced into the electrodes at their bottoms and removed at their tops.

A second container, divided into the two parts 36a and 36b, is provided for the electrolyte. Into container part 36a feeds electrolyte inlet 37. The electrolyte is forced under pressure from container part 36a through the porous wall of container 71 adjoining container part 36a, thence streaming transversely through the entire cell. The electrolyte then leaves the cell on its cathode side through the opposite porous wall of container 71 adjoining container part 36b, into container part 36b, and then out the electrolyte outlet 38. Those outer parts of container 71 which do not adjoin container parts 36a and 36b are sealed to prevent electrolyte seepage through them. Container part 36b has a porous wall 39 through which the water formed by the reaction of oxidized hydrogen and reduced oxygen can pass out of the electrolyte and into the space 70 formed by wall 74. From space 70, the water of reaction is carried away by a cooling air flow up through space 70. Wall 74 is spaced from wall 39 by spacer 73. Space 70 is open to the top and to the bottom, to permit the air flow.

In FIG. 4, cell unit 42 corresponds to the cell illustrated in FIG. 3. Two additional, like cell units 40 and 41 are arranged connected electrically in series alongside cell unit 42. It will be noted that each of the cell units is divided by partitions 75, 75', 75'' into eleven individual cells along their depths. The individual cells are connected electrically in parallel by graphite lids 7 and 8. As in the case of FIG. 2, a single container 71, with a continuous membrane 72, can be used for each cell unit, each container then being divided up by partitions 75. Main electrolyte feed canal 43 and main electrolyte withdrawal canal 44 are connected to inlets 37 and outlets 38, respectively. Air spaces 70 and 70' are indicated in FIG. 4. In FIG. 4, it will be noted that wall 74 of FIG. 3 serves as a wall of container part 36a' of the middle cell unit 41.

To make the cells, or cell units, of FIGS. 1 to 4 is extremely simple. Into the geometrically simple containers is merely filled catalyst powder, and then the lids 7 and 8 are set in place. The lids may be clamped in place under the action of springs, in order to always keep the catalyst powder under a constant, mechanical pressure. The electrolyte can get at the anode and cathode chambers, and thus at the catalyst powders to soak them, through the lids 7 and 8 or through porous container walls.

Figure 5:
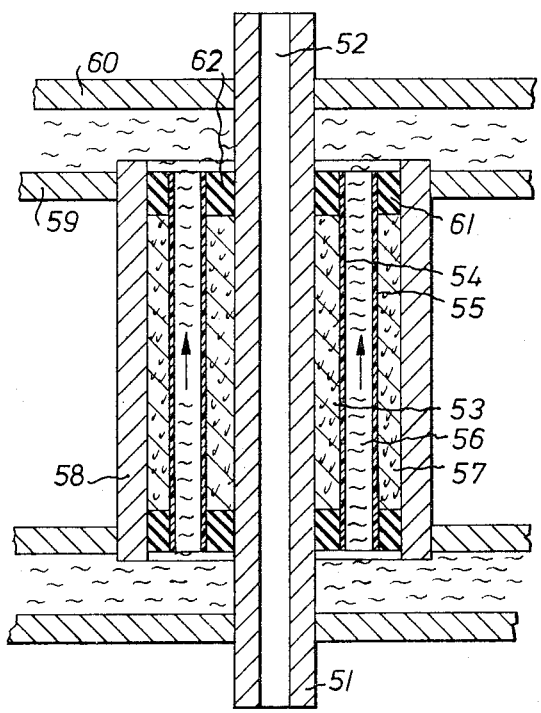
FIG. 5 is a schematic elevational section through another embodiment of a fuel cell according to the present invention.

FIG. 5 shows a cell with a streaming electrolyte. It is suitable for consuming gaseous and/or liquid fuels and oxidants and has a concentric tube construction wherein the electrodes are cylindrical and concentric to one another. The cell includes an inner contact, cylindrical rod 51, which serves as the current conductor for the inner electrode. Rod 51 is made porous when used for a gas electrode and has bore 52 for the feeding of the gas. Contact rod 51 is made of a corrosion resistant material, for example nickel or graphite.

Rod 51 is surrounded by a particulate catalyst filling 53 standing under a contact pressure. This filling can be solely of catalyst powder, or other particulate materials can be present which raise the power density, such as activated carbon of a particle size improving the feeding of gas through the electrode, or graphite for increasing the effective internal conductivity of the electrode. The inner electrode is bounded on its radially outward side by a cylindrical, porous, hydrophilic, gas-blocking and insulating tube 54, which can be made of a polymer material.

Tube 54 has longitudinal ribs on its radially outer side (not shown) for holding a second, like tube 55 centered and at a distance. Electrolyte chamber 56 lies between the tubes 54 and 55, and the electrolyte streaming through chamber 56 physically contacts tubes 54 and 55 and can penetrate through them. Surrounding tube 55 on its radially outer side is catalyst filling 57 of the outer electrode.

An external cylindrical contact tube 58 serves as a current lead for the outer electrode.

Tubes 52 and 58, made of graphite for instance, serve as current leads and possibly as means through which gas can enter the electrodes. In the case of gas electrodes, the outer contact tube 58 can be made hydrophobic on its outer surface, in order to prevent escape of electrolyte. For the further contacting of the electrodes and additionally for forming channels for electrolyte flow, elements 59 and 60, for example plates insulated from one another, are provided. These plates are made of electrically conductive material which forms a barrier to the electrolyte, such as graphite. The chambers formed by the tube sets 51 and 54, and 55 and 58, for the catalyst powders 53 and 57 are sealed by the elements 61 and 62, which exert a continual compacting pressure on the powder filling. These elements may include an elastic material for sealing and exertion of a compacting pressure and a rigid portion connected to the adjoining tubes 51 and 54, and 55 and 58.

Figure 6:
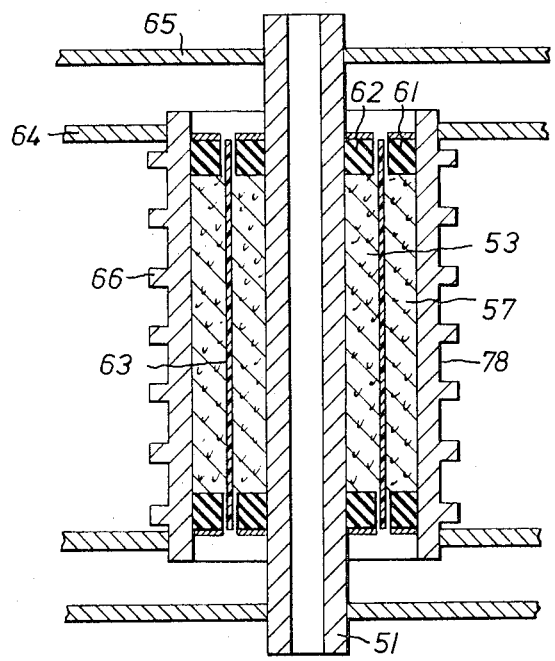
FIG. 6 is a schematic elevational section through another embodiment of a fuel cell according to the present invention.

The cell of FIG. 6 works, like that of FIG. 5, with liquid fuels or gas; however, the cell of FIG. 6 has a fixed electrolyte. Here, an inner contact rod 51 is used, together with an outer contact tube 78, which has been modified from tube 58 as explained below. Between these two contact elements is a single insulating tube 63, which allows electrolyte ion-flow across it while at the same time preventing movement of fuel and oxidant to the wrong electrode. Tube 63 may be made, for example, of ion exchanging material. The resulting chambers contain the catalyst particulate fillings 53 and 57. As in FIG. 5, the chambers for the catalyst fillings 53 and 57 are sealed by the elements 61 and 62, which maintain the fillings under a constant pressure for providing good interparticle contact. Elements 64 and 65 serve for contacting the electrodes.

Since, in the embodiment of FIG. 6, there is no electrolyte flow, and no concentration and heat transport takes place, the cell is cooled by means of a liquid or gas on the outer contact tube 78, which has been modified from tube 58 by the provision of cooling ribs 66. Contact tube 78 can, for example, belong to the air/oxygen electrode and its porosity can result in the water of reaction being given off to the air flowing by the outer surface.

Operating with a liquid fuel it is necessary to prevent it from crossing the porous membranes 54 and 55 only if the catalyst of the opposite electrode shows any catalytic activity for this fuel. In this case a suitable liquid separating ion-exchange-membrane is to be applied.

As to the particle size distribution of the used catalyst powders, it is to be within a narrow range. The medium particle size of different catalysts may vary from 0.1 micron, for instance in the case of WC-catalyst, up to 500 microns as in the case of activated charcoal.

The gas transport into the catalyst powder is provided by the necessary gas pressure so that gas penetrates the porous tubes 51 and 58 and enters those holes of the powder filling that are large enough to be set free of the electrolyte. In the inner of the catalyst particles gas diffusion will occur while on large distances such as through the powder electrode and the porous tubes, streaming of the gas is predominant.

The section view figure 5 makes apparent some marks of a 3-zone-gas-diffusion-electrode as to the small porous gas-impervious membranes 54 and 55 corresponding to the "surface-layer" the catalyst powder 53 and 57 corresponding to the "working-layer" and the roughly porous tubes 51 or 58 corresponding to the "gas-transport-layer" of a 3-zone-gas-diffusion-electrode.

The basic difference to prior constructions is the way of carrying into effect the powder electrode with the consequence of a very high efficiency.

For instance in this powder electrode there is a lack of the additional catalytic inactive bonding materials and the corresponding bonding structure of a solid gas-diffusion electrode.

Further there is no sintering process of plastics or metals or ceramics by which part of the catalyst surface is enwrapped and blocked as well as a great number of pores are closed and inefficient for the required transport and electrode processes. The result is a diminution of catalyst surface and an unsufficient penetration of the electrode process across the thickness of the "working-layer" of a solid electrode.

Contrary to this the described powder electrodes possess an all open pore structure that in case of the statistically dispersed size and form of its particles shows an enlarged spectrum of pore size by which results a strongly intermixed bivalent pore system that produces a steady locally changing of contact between the gas, the electrolyte and the catalyst surface. By this way an intensive electrode process through going the whole powder filling is enforced as soon as the needed electronic contact is effected by an equally distributed and sufficiently high compacting pressure of about 10 kp./cm.$^2$ produced by the elements 61 and 62 in connection with the tubes 51, 54, 55, 58.

The invented construction thus allows to attain the high contact pressure needed to get performance densities of more than 5000 mA./cm.$^3$.

This means a decisive advantage against prior powder electrodes of flat spreaded shape that will not work sufficiently because the needed high contact pressure may not be practically produced all over the area.

Especially advantageous in the present invention is that the catalyst powder is simply filled into a container; this makes it very easy to construct the electrodes. Another advantage lies in the power per unit weight of catalyst resulting in the present invention as compared with prior electrode designs; this is a result of the intimate mixing of electrolyte, gas, and catalyst (three phase mixing) over the entire electrodes. Prior cells provide only a narrow three-phase reaction zone in their electrodes. For the same catalyst quantity, the electrodes of the present invention produce about four times the power provided by gas-diffusion electrodes. Even soluble fuels can be used, these being interspersed in the anode by being carried in by the soaking electrolyte. The present invention furthermore makes it possible to make a cell having a fixed electrolyte with the cooling being effected from the outside. The making of fuel batteries is likewise very simple, and a high power density and a low weight per unit of power are obtained.

The polymer membranes are samples of the company Grace GmbH. Hamburg with the trademark OBTL 3000. The membranes possess a thickness in the range of 0.3 to 1 mm. and a porosity of about 70%. The capillary pressure amounts to 5 at in 2 N $H_2SO_4$.

The container 71 and the membrane 72 may be manufactured of a porous ceramics or of a porous plastic material. In the case of the ceramics (Haldenwanger, Berlin, trademark TZ) the walls and the membrane are connected by an adhesive. Using the porous plastic material, e.g. porous polyvinylchloride, the plates are joined by a welding process.

The porous wall 39 is established by a sheet of porous PTFE manufactured by Pampus KG., Schiefbahn under the trademark "Filterfolie AL." This material has hydrophobic properties, only vapor of water can diffuse through this porous wall. The pore size is in the range of about 1 $\mu$m.

It will be understood that the above description of the present invention is susceptible to various modifications, changes and adaptations, and the same are intended to be comprehended within the meaning and range of equivalents of the appended claims.

What is claimed is:

1. A fuel cell comprising an anode in the form of a particulate filling, means for containing said anode, a cathode in the form of a particulate filling, means for containing said cathode, means for enabling soaking of said anode and said cathode by an electrolyte continuous between said anode and said cathode, means for enabling the interspersing of fuel in said anode, and means for enabling the interspersing of oxidant in said cathode, said means for containing said anode and said means for containing said cathode together comprising a box-shaped container and a porous, gas-impervious dividing wall means for dividing the container into two chambers, said means for enabling soaking including said wall means, said mole filling, filling one of said chambers and said cathode filling, filling the other of said chambers, and said means for enabling the soaking and the interspersing including tubes penetrating into said fillings.

2. A fuel cell as claimed in claim 1, wherein said means for containing further include separate lid means for closing said chambers, said lid means containing bores in communication with said tubes and bore means for extracting from said chambers mixtures of electrolyte with fuel and oxidant.

3. A fuel cell as claimed in claim 2, wherein said means for containing further include additional wall means, arranged perpendicularly to said dividing wall means, for creating from said chambers pluralities of separate anode and cathode chambers, said lid means being continuous between the plurality of anode chambers and between the plurality of cathode chambers.

4. A fuel cell comprising an anode in the form of a particulate filling, means for containing said anode, a cathode in the form of a particulate filling, means for containing said cathode, means for enabling soaking of said anode and said cathode by an electrolyte continuous between said anode and said cathode, means for enabling the interspersing of the fuel in said anode, and means for enabling the interspersing of oxidant in said cathode, said means for containing said anode and said means for containing said cathode together comprising a box-shaped porous container and a porous gas-impervious dividing wall means for dividing the container into two chambers, said anode filling, filling the other of said chambers, said means for enabling interspersing including tubes penetrating into said fillings, and said means for enabling soaking including container part means for enabling electrolyte to be forced through a first wall of said container, thence to stream transversely through the chambers, and then to leave through a wall of said container opposite to said first wall.

5. A fuel cell comprising an anode in the form of a particulate filling, means for containing said anode, a cathode in the form of a particulate filling, means for containing said cathode, means for enabling soaking of said anode and said cathode by an electrolyte continuous between said anode and said cathode, means for enabling the interspersing of fuel in said anode, and means for enabling the interspersing of oxidant in said cathode, said means for containing providing said fillings with cylindrical shapes, said fillings being concentric, said means for soaking including a portion of said means for containing forming an electrolyte chamber extending between said fillings, the portion of the means for containing bounding the electrolyte chamber being porous, whereby electrolyte streaming through said electrolyte chamber can penetrate into said fillings, and said means for interspersing including a rod bounding the innermost filling surface, said rod having a bore.

6. A fuel cell comprising an anode in the form of a particulate filling, means for containing said anode, a cathode, in the form of a particulate filling, means for containing said cathode, means for enabling soaking of said anode and said cathode by an electrolyte continuous between said anode and said cathode, means for enabling the interspersing of fuel in said anode, and means for enabling the interspersing of oxidant in said cathode, said means for containing including an inner contact rod, an outer contact tube, and a porous insulating tube between the inner contact rod and the outer contact tube, and said fillings, filling the resulting chambers between the inner contact rod and the porous insulating tube and between the porous insulating tube and the outer contact tube.

References Cited

UNITED STATES PATENTS

| | | | |
|---|---|---|---|
| 3,551,207 | 12/1970 | Herbst | 136—86 R |
| 3,597,275 | 8/1971 | Winsel et al. | 136—86 E |
| 3,666,405 | 5/1972 | Winsel | 136—86 E |
| 3,121,031 | 2/1964 | Gruneberg et al | 136—86 R |
| 3,510,354 | 5/1970 | Hess et al | 136—86 R |
| 3,623,912 | 11/1971 | Wessling | 136—86 D |

FOREIGN PATENTS

| | | | |
|---|---|---|---|
| 532,900 | 11/1956 | Canada | 136—86 |

DONALD L. WALTON, Primary Examiner

U.S. Cl. X.R.

136—160